United States Patent
Vermeulen

(10) Patent No.: US 9,664,853 B2
(45) Date of Patent: May 30, 2017

(54) LOW-LOSS WAVEGUIDE TRANSITION

(71) Applicant: Acacia Communications, Inc., Maynard, MA (US)

(72) Inventor: Diedrik Vermeulen, New York, NY (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 14/796,552

(22) Filed: Jul. 10, 2015

(65) Prior Publication Data

US 2016/0011371 A1 Jan. 14, 2016

Related U.S. Application Data

(60) Provisional application No. 62/023,487, filed on Jul. 11, 2014.

(51) Int. Cl.
| | |
|---|---|
| *G02B 6/12* | (2006.01) |
| *G02B 6/00* | (2006.01) |
| *G02B 6/122* | (2006.01) |
| *G02B 6/126* | (2006.01) |
| *G02B 6/136* | (2006.01) |
| *G02B 6/30* | (2006.01) |

(52) U.S. Cl.
CPC .......... *G02B 6/1228* (2013.01); *G02B 6/126* (2013.01); *G02B 6/136* (2013.01); *G02B 6/305* (2013.01); *G02B 2006/12061* (2013.01)

(58) Field of Classification Search
None
See application file for complete search history.

(56) References Cited

U.S. PATENT DOCUMENTS

| | | | | |
|---|---|---|---|---|
| 6,396,984 | B1 * | 5/2002 | Cho ..................... | G02B 6/1228 385/28 |
| 7,792,403 | B1 * | 9/2010 | Little ................... | G02B 6/1228 385/11 |
| 2005/0084991 | A1 | 4/2005 | Lee et al. | |
| 2005/0202554 | A1 * | 9/2005 | Luo ..................... | G02B 6/1228 435/287.2 |
| 2006/0018584 | A1 * | 1/2006 | Watts .................... | G02B 6/126 385/11 |
| 2010/0002989 | A1 * | 1/2010 | Tokushima .......... | G02B 6/1228 385/14 |

(Continued)

FOREIGN PATENT DOCUMENTS

GB 2 326 020 A 12/1998

OTHER PUBLICATIONS

Debackere et al., Bulk sensing experiments using a surface-plasmon interferometer. Opt Lett. Sep. 15, 2009;34(18):2858-60.

(Continued)

*Primary Examiner* — Hemang Sanghavi
(74) *Attorney, Agent, or Firm* — Wolf, Greenfield & Sacks, P.C.

(57) ABSTRACT

A waveguide device that includes a first waveguide, a second waveguide and a transition region. The first waveguide has a first height and the second waveguide has a second height different from the first height. The transition region is between the first waveguide and the second waveguide and includes an asymmetrical taper of the first waveguide.

14 Claims, 8 Drawing Sheets

(56) References Cited

U.S. PATENT DOCUMENTS

2014/0153862 A1* 6/2014 Picard .................. G02B 6/1228
385/11

OTHER PUBLICATIONS

Densmore et al., A silicon-on-insulator photonic wire based evanescent field sensor. IEEE Photon Tech Lett. Dec. 1, 2006;18(23):2520-2. doi: 10.1109/LPT.2006.887374.

Van Laere et al., Compact focusing grating couplers for silicon-on-insulator integrated circuits. IEEE Photon Tech Lett. 2007;19(23):1919-21.

Vermeulen et al., Efficient Tapering to the Fundamental Quasi-TM Mode in Asymmetrical Waveguides. 15th European Conference on Integrated Optics, Cambridge. WeP16. Apr. 7-9, 2010. 2 pages.

International Search Report and Written Opinion mailed Sep. 18, 2015 for Application No. PCT/US2015/039987.

Chen et al., Low-Loss and Broadband Cantilever Couplers Between Standard Cleaved Fibers and High-Index-Contrast Si3N4 or Si Waveguides. Photonics Technol Lett IEEE, 2010;22(23):1744-6.

Pu et al., Ultra-low-loss inverted taper coupler for silicon-on-insulator ridge waveguide. Opt Commun. Oct. 2010;283(19):3678-82.

International Preliminary Report on Patentability mailed Jan. 26, 2017 for Application No. PCT/US2015/039987.

* cited by examiner

LOW-LOSS WAVEGUIDE TRANSITION

RELATED APPLICATIONS

The present application claims the benefit under 35 U.S.C. §119(e) of U.S. Provisional Patent Application Ser. No. 62/023,487 entitled "LOW-LOSS WAVEGUIDE TRANSITION," filed Jul. 11, 2014, which is incorporated herein by reference in its entirety.

BACKGROUND

Field

The present application relates to photonic waveguide structures.

Related Art

Waveguides are used in many applications to efficiently confine and guide electromagnetic radiation. Some waveguides are created using the principle of total internal reflection within a dielectric, or an approximation thereof. For example, in the field of integrated photonics, a first dielectric material of a first index of refraction is used to form a waveguide path and a dielectric of a second dielectric material, with a second index of refraction with a smaller value than the first index of refraction, is formed around the waveguide path. Using a dielectric material with a larger index as the waveguide path results in guiding the electromagnetic radiation down the waveguide path.

Silicon is conventionally used to create waveguides for wavelengths of light used in the telecommunications industry for at least two reasons. First, silicon has a low absorption coefficient (the imaginary part of the index of refraction) resulting in transparent waveguides at wavelengths used in telecommunications. Second, the real part of the index of refraction is high (n~3.5), resulting in good confinement of the electromagnetic radiation within the waveguide. Thus, silicon waveguides designed for use at telecommunication wavelengths, in the region from 1260 nm to 1675 nm, can have small transverse dimensions relative to the wavelength of the confined electromagnetic radiation. For example, conventional silicon waveguides at telecommunications wavelengths may have transverse dimensions on the order of hundreds of nanometers.

A waveguide has several properties that determine the characteristics of the electromagnetic radiation that is guided by the waveguide. In particular, the transverse dimensions of the waveguide (e.g., the horizontal and vertical directions that are perpendicular to the direction of propagation of the light down the waveguide path) determine the mode structure of the guided radiation. For example, the number of modes that may be supported by the waveguide is determined by the transverse dimensions of the waveguide.

BRIEF SUMMARY

Aspects of the present application provide a novel technique for transitioning between two waveguides with different transverse dimensions.

Some embodiments are directed to a waveguide device that includes a first waveguide, a second waveguide and a transition region. The first waveguide has a first height and the second waveguide has a second height different from the first height. The transition region is between the first waveguide and the second waveguide and includes an asymmetrical taper of the first waveguide.

Other embodiments are directed to a method that includes receiving light within a first waveguide of a photonic chip, and transitioning the light from the first waveguide to a second waveguide of the photonic chip using an asymmetrical taper of the first waveguide. The first waveguide has a first height that is different from a second height of the second waveguide.

Other embodiments are directed to a method of fabricating a waveguide device that includes a first waveguide formed from a guiding material with a first width. The method includes acts of: forming a first mask over a guiding material layer of a first depth, wherein the first mask leave a portion of the guiding material layer exposed, wherein the exposed portion of the guiding material layer has a second width greater than the first width and is asymmetric with respect to an imaginary plane that bisects the width of the first waveguide; partially removing the exposed portion of the guiding material layer down to a second depth that is less than the first depth; removing the first mask; forming a second mask over the guiding material layer, wherein the second mask is a rectangle with a width equal to the first width; removing the guiding material layer that is not protected by the second mask; and removing the second mask.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Efficient coupling from a waveguide on a chip to optical fiber (and vice versa) is achieved when the transverse mode size of the electromagnetic radiation that propagates in the waveguide is approximately the same as the transverse mode size of the electromagnetic radiation that propagates in the fiber. However, the transverse cross-sections of waveguides on integrated chips are typically smaller than the transverse cross-sections of optical fibers, resulting in different transverse mode sizes of the guided light. The inventors have recognized and appreciated that efficient coupling between a waveguide and an optical fiber can be achieved by first transitioning the electromagnetic radiation guided on the chip using a first waveguide with a first transverse cross-section to a second waveguide with a second transverse cross-section that guides electromagnetic radiation with a transverse mode size that more closely matches the transverse mode size of optical fiber. The transition between the two waveguides should be low-loss for both quasi-transverse electric (TE) modes and quasi-transverse magnetic (TM) modes of the waveguide.

Figure 1:
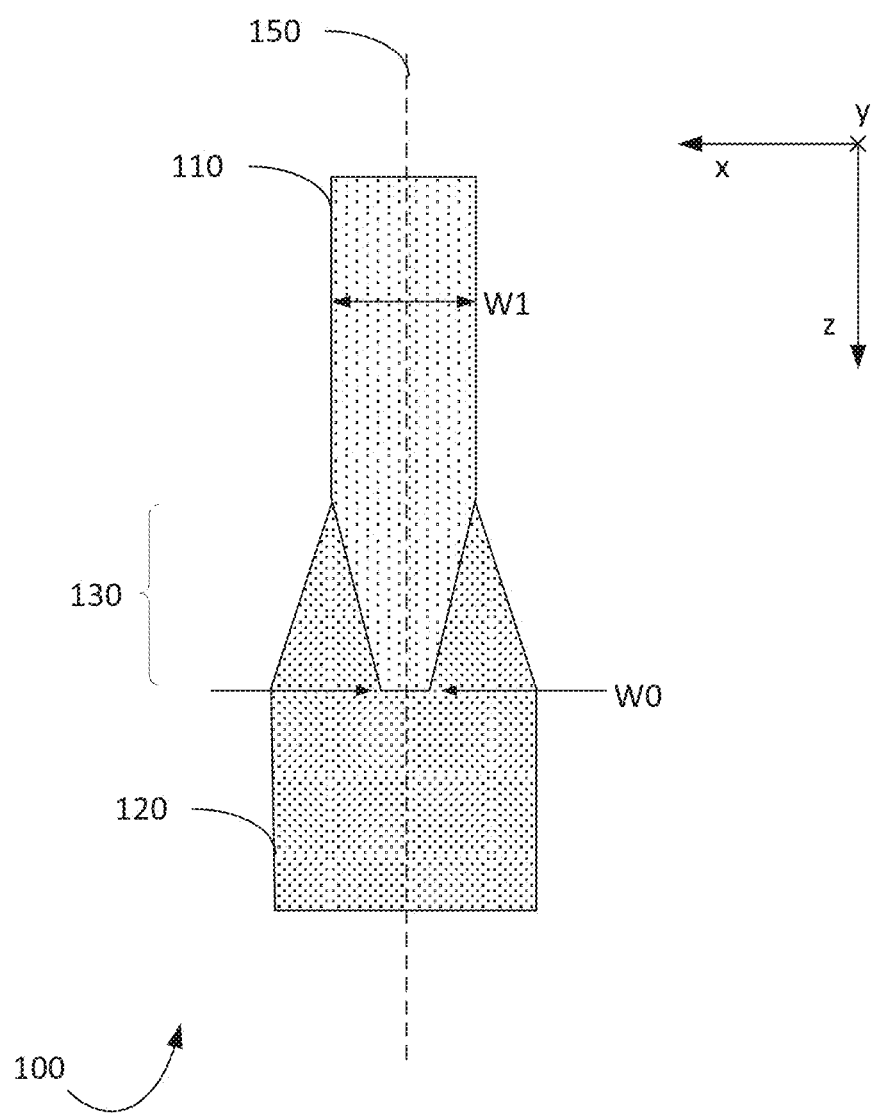
FIG. 1 illustrates a waveguide transition according to the prior art.

FIG. 1 illustrates a top elevation view of a waveguide transition 100 according to conventional prior art techniques. A first waveguide 110 with a first height (e.g., approximately 220 nm, as measured in the y-direction going into the paper) transitions into a second waveguide 120 with a second height that is less than the first height (e.g., approximately 150 nm, as measure in the y-direction going into the paper). The first waveguide 110 and the second waveguide 120 provide a confined path in the z-direction, down which the electromagnetic radiation propagates. A transition region 130 is a region corresponding to a range of values in the z-direction where the first waveguide 110 and the second waveguide 120 coexist. The transition region includes a taper of the first waveguide 110, which is symmetric about an imaginary plane of symmetry 150 that is in the y-z plane and bisects the width of the first waveguide. The taper reduces the width of the first waveguide 110 from a first width (W1) to a second width (W0).

The inventors have recognized and appreciated that the finite width (W0) of the end of the taper in the transition region of conventional waveguide transitions results in insertion losses for electromagnetic radiation being transitioned from the first waveguide 110 to the second waveguide 120. In particular, losses in the TM mode are significant, resulting in a lossy transition that is not equally lossy for both TE and TM modes. Additionally, the inventors have recognized and appreciated that, using conventional techniques, the width (W0) at the end of the symmetric taper cannot be reduced further due to limits of the lithographic processes used to create the taper in the transition region 130. Accordingly, some embodiments are directed to a lower-loss technique for coupling electromagnetic radiation from a first waveguide to a second waveguide, where the two waveguides have different transverse cross-sections. In some embodiments, an asymmetric transition region is created to transition from a first waveguide to a second waveguide. In some embodiments, the asymmetric transition region includes a taper that has a width that decreases by have a first side wall of the waveguide angle towards the opposing side wall of the waveguide. Thus, the transition region includes a gradual termination of the first waveguide that starts at one edge of the second waveguide and continues to the opposing edge of the second waveguide in a monotonic fashion.

Embodiments may be used for fiber-to-chip coupling, chip-to-fiber coupling, and chip-to-chip coupling, but are not limited to these applications. The chips may be photonic integrated circuits (PICs) in some embodiments, for example implemented with silicon photonics. Waveguide transitions according to some embodiments may be used in any application where it is desirable to couple electromagnetic radiation from a first waveguide with a first transverse cross-section to a second waveguide with a second transverse cross-section different from the first transverse cross-section.

Embodiments are described herein in connection with silicon waveguides commonly used in integrated photonics to guide light at telecommunications wavelengths, such as light in the O-band (from 1260 nm to 1360 nm) and the C-band (from 1530 nm to 1565 nm). However, embodiments are not so limited. Any electromagnetic wavelength may be guided, such a ultraviolet light, visible light, and infrared light. Additionally, embodiments are not limited to using silicon as the guiding material. Any material (e.g., a dielectric material) with a suitable index of refraction, such as silica or silicon nitride, may be used to form the waveguides of some embodiments.

The aspects and embodiments described above, as well as additional aspects and embodiments, are described further below. These aspects and/or embodiments may be used individually, all together, or in any combination of two or more, as the application is not limited in this respect.

Figure 2:
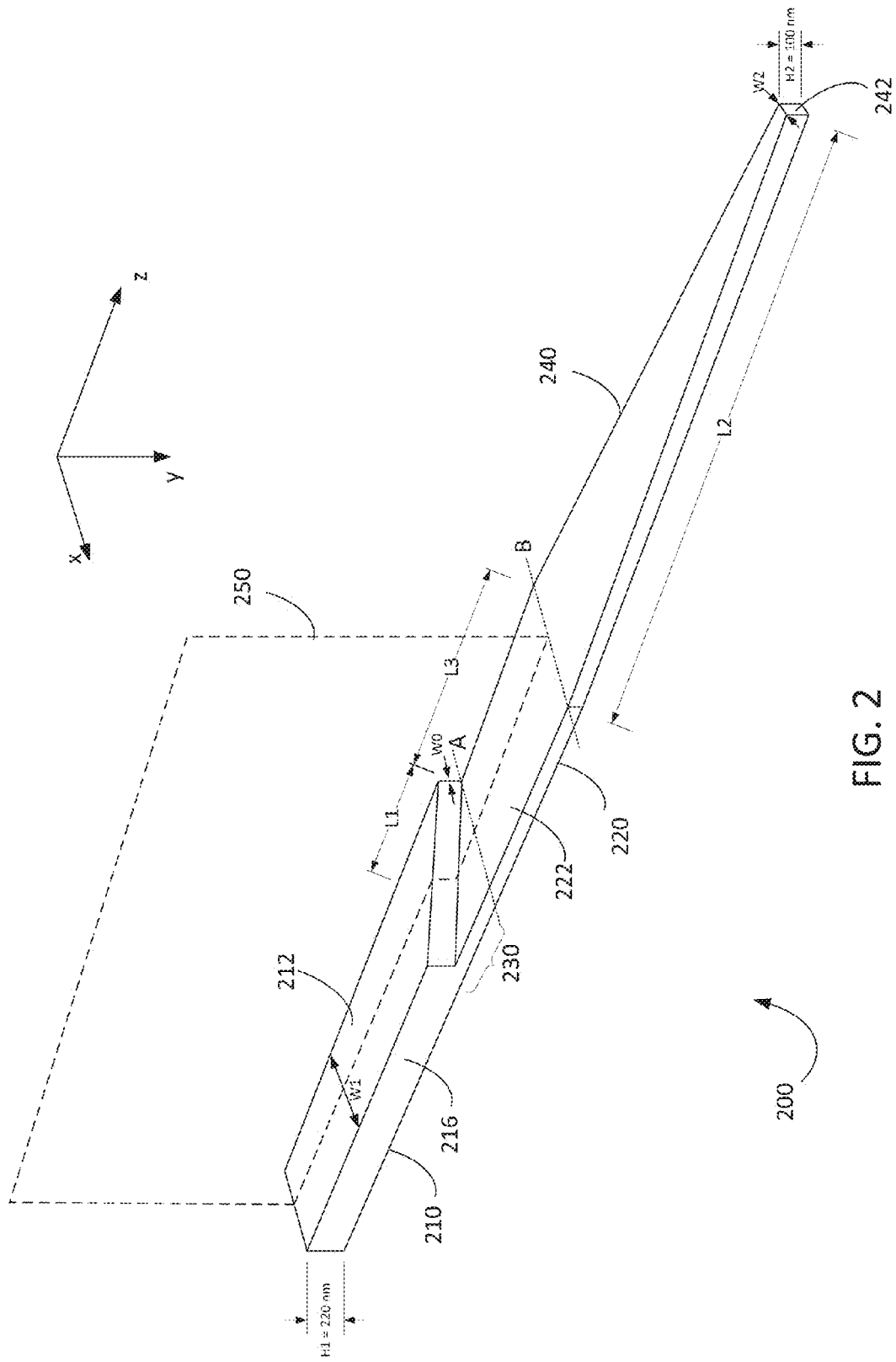
FIG. 2 is a perspective view of a waveguide device according to some embodiments.
Figure 4:
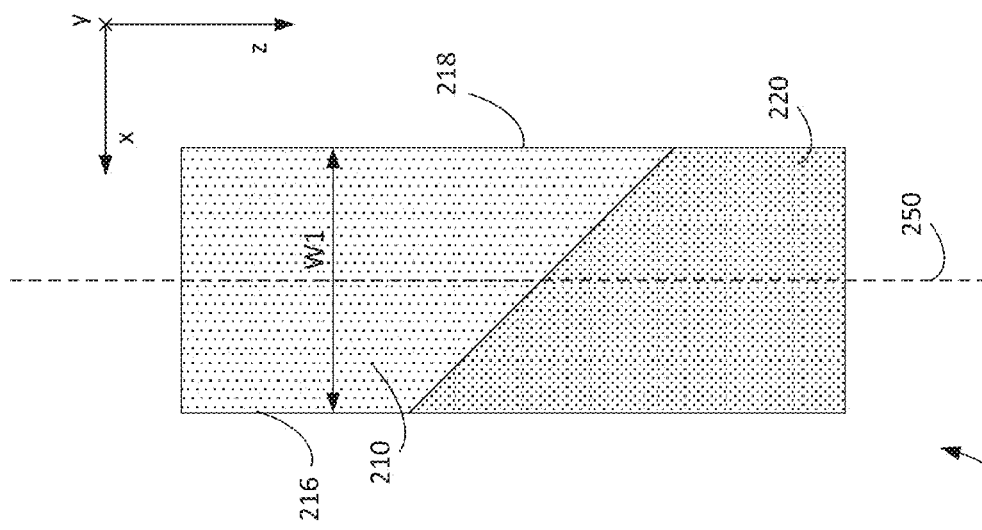
FIG. 4 is a top elevation view of a portion of the waveguide device of FIG. 2 according to some embodiments.
Figure 4:
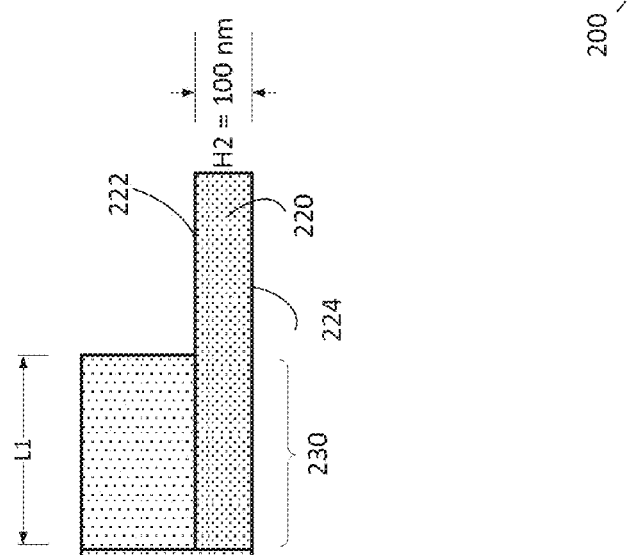
Figure 3:
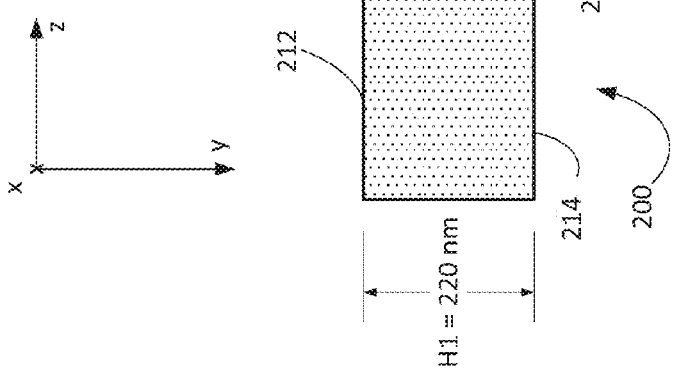
FIG. 3 is a side elevation view of a portion of the waveguide device of FIG. 2 according to some embodiments.

FIGS. 2-4 illustrate a waveguide device 200 according to some embodiments. FIG. 2 is a perspective view of a waveguide device, FIG. 3 is a side elevation view of the waveguide device, and FIG. 4 is a top elevation view of the waveguide device, showing the transition region 230 and the area near the transition region 230. The same reference characters are used for identical features between these three drawings. The waveguide device 200 may be part of a larger PIC that includes many different components. In some embodiments, the waveguide device 200 includes a multi-region waveguide composed of multiple portions.

A first waveguide 210 with a first height H1 transitions into a second waveguide 220 with a second height H2 that is less than the first height H1 via a waveguide transition region 230. The first waveguide 210 and the second waveguide 220 provide a confined path in the z-direction, down which light propagates. The waveguides may be of any height (the height is the thickness of the waveguides in the y-direction illustrated in FIG. 2). For example, in other embodiments, the first waveguide may have a height that is less than the second height. For example, the first height H1 may be approximately 220 nm and the second height H2 may be approximately 150 nm. The height of the first waveguide 210 is the distance between the top surface 212 and the bottom surface 214 (see FIG. 3), and the height of the second waveguide 220 is the distance between the top surface 222 and the bottom surface 224 (see FIG. 3). In some embodiments, the bottom surface 214 of the first waveguide 210 is at the same level as the bottom surface 224 of the second waveguide 220. In some embodiments, the top surface 212 of the first waveguide 210 is at a different level than the top surface 222 of the second waveguide 220.

The first waveguide 210 may have any width (W1) in the x-direction. In some embodiments, the width (W1) is kept sufficiently narrow to prevent the polarization of the guided light from transforming from a first polarization (e.g., TE) to a second polarization (e.g., TM). This may be done in some embodiments by using a width (W1) that is sufficiently narrow to prevent the TE1 mode from being guided by the waveguide. For example, the width (W1) of the first waveguide 210 may be selected such that only one mode for each polarization (TE and TM) is guided by the waveguide at the operational wavelength. Any operational wavelength may be used. In some embodiments, visible, ultraviolet or infrared light may be used. In other embodiments, the operational wavelength of the waveguide device 200 may be at telecommunications wavelengths. For example, the operation wavelength of the waveguide device 200 may be in the O-band or the C-band. In some embodiments, the width (W1) may be less than 500 nm and greater than 350 nm. In further embodiments, the width (W1) may be less than or equal to 450 nm and greater than or equal to 400 nm. In yet further embodiments, the width may be approximately 450 nm.

The waveguides may be formed from any guiding material with a suitable index of refraction at the operational wavelength. In some embodiments, the waveguides are formed from a dielectric with an index of refraction greater than 2.0 and less than 4.2 at the operational wavelength. In further embodiments, the waveguides are formed from a dielectric with an index of refraction greater than 3.0 and less than 4.2 at the operational wavelength. In yet further embodiments, the waveguides are formed from a dielectric with an index of refraction greater than 3.4 and less than 4.2 at the operational wavelength. The operational wavelength may be, for example, any wavelength used in telecommunications, such as the C-band or the O-band. For example, the waveguides may be formed from silicon, which has an index of refraction of approximately 3.5 at telecommunication wavelengths.

In some embodiments, the waveguides 210 and 220 of the waveguide device 200 may be formed on top of a layer of a dielectric material with a lower index of refraction than the index of refraction used to form the waveguides. For clarity, this layer is not illustrated in the figures. For example, the waveguides 210 and 220 may be formed on a layer of silica. The layer of silica may itself be formed on top of a silicon substrate, also not illustrated. Additionally, the waveguides 210 and 220 may be covered with a dielectric material, which is also not illustrated in the figures. For example, a layer of silicon dioxide, silicon nitride or silicon oxynitride may be formed such that it covers the top surface 212 of the first waveguide 210 and the top surface 222 of the second waveguide 220 as well as the side surfaces of the waveguides.

A transition region 230 is a region corresponding to a range of values in the z-direction where the first waveguide 210 and the second waveguide 220 coexist. The transition region 230 has a length L1 in the z-direction. In some embodiments, the length L1 of the transition region is greater than the width W1 of the first waveguide 210. In some embodiments, the length L1 is greater than $2*W1^2*n\lambda$, where n is the effective refractive index of the mode and $\lambda$ is the optical wavelength. In such embodiments, the length L1 is substantially longer than W1. For example the length of L1 may be greater than 10 microns, but less than 50 microns. In other embodiments, L1 may be greater than 10 microns, but less than 30 microns. In yet further embodiments, L1 may be approximately 20 microns, or any value or range of values within those ranges listed. The transition region includes a taper of the first waveguide 210, which is asymmetric about an imaginary plane of symmetry 250 that is in the y-z plane and bisects the width of the first waveguide. The taper reduces the width of the first waveguide 210 from a first width W1 to a second width W0. In some embodiments, the second width W0 may be less than 50 nm. In other embodiments, the second width W0 may be less than 30 nm. In yet further embodiments, the first waveguide 210 may be tapered completely such that the second width W0 is zero. In some embodiments, the taper of the first waveguide 210 begins from a first side surface 216 of the first waveguide 210 and ends at a second side surface 218 of the first waveguide 210 (see FIG. 4). The figures illustrate the taper as being a linear taper such that the width of the first waveguide 210 decreases linearly as a function of the location along the z-axis. However, embodiments are not so limited. In some embodiments, the taper may be a nonlinear taper, such as an exponential taper, a logarithmic taper or any other monotonic function.

The transition region 230 includes a step down in the y-direction as the first waveguide 210 transitions to the second waveguide 220. In some embodiments, this step down is discrete and is not tapered.

In some embodiments, the second waveguide 220 has a height in the y-direction that is less than the height of the first waveguide 210. By way of example and not limitation, the height of the second waveguide 220 may be less than 200 nm. In some examples, the height of the second waveguide 220 may be approximately 100 nm.

In some embodiments, the second waveguide 220 includes at least two portions. A first portion may be immediately adjacent to the transition region 230 and be a standard waveguide configuration. The first portion may be of length L3 in the z-direction. The transverse cross-section of the first portion of the second waveguide is the same at the end of the first portion adjacent to the transition region 230 (marked with the dashed line labeled A in FIG. 2) and the end of the first portion adjacent to a second portion (marked with the dashed line labeled B in FIG. 2). In other words, the width in the x-direction and the height in the y-direction is substantially constant (e.g., any variation is due to errors and tolerances in the fabrication process) throughout the length of the first portion of the second waveguide 230.

A second portion of the second waveguide 220 may include a tapered region 240 of length L2. The width of the tapered region 240 decreases as a function of position along the z-direction. For example, the tapered region 240 has a first width (W1) equal to the width of the first waveguide 210 at an end adjacent to the first portion of the second waveguide 220 and a second width (W2) at the distal end of the second waveguide 220. The second portion terminates at terminal face 242 that is rectangular in shape with a width W2.

Figure 5B:
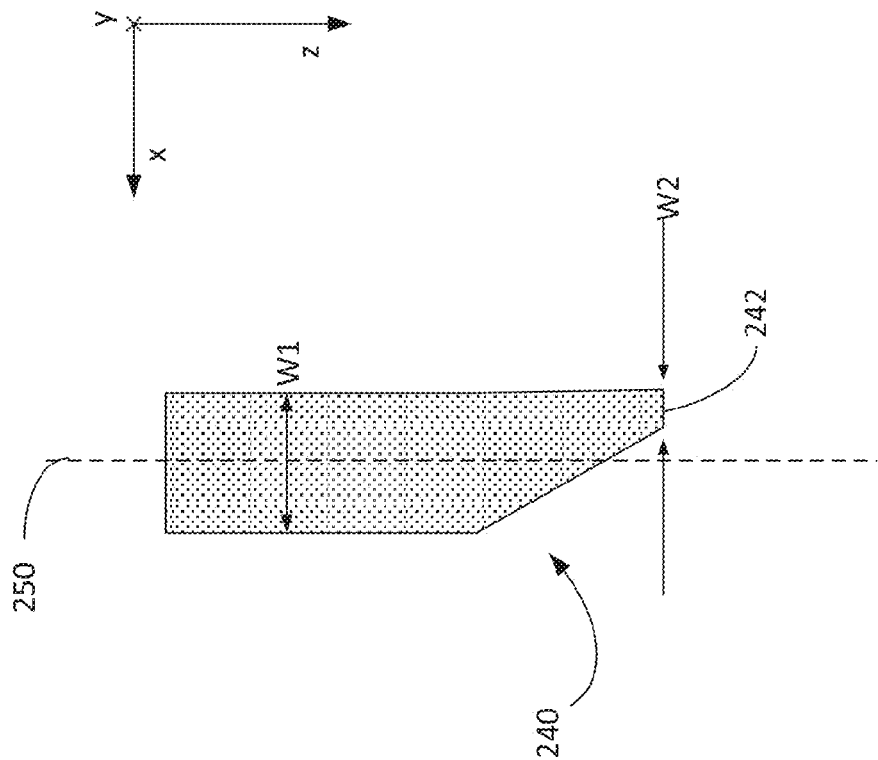
FIG. 5B is a top elevation view of a asymmetric tapered region according to some embodiments.
Figure 5A:
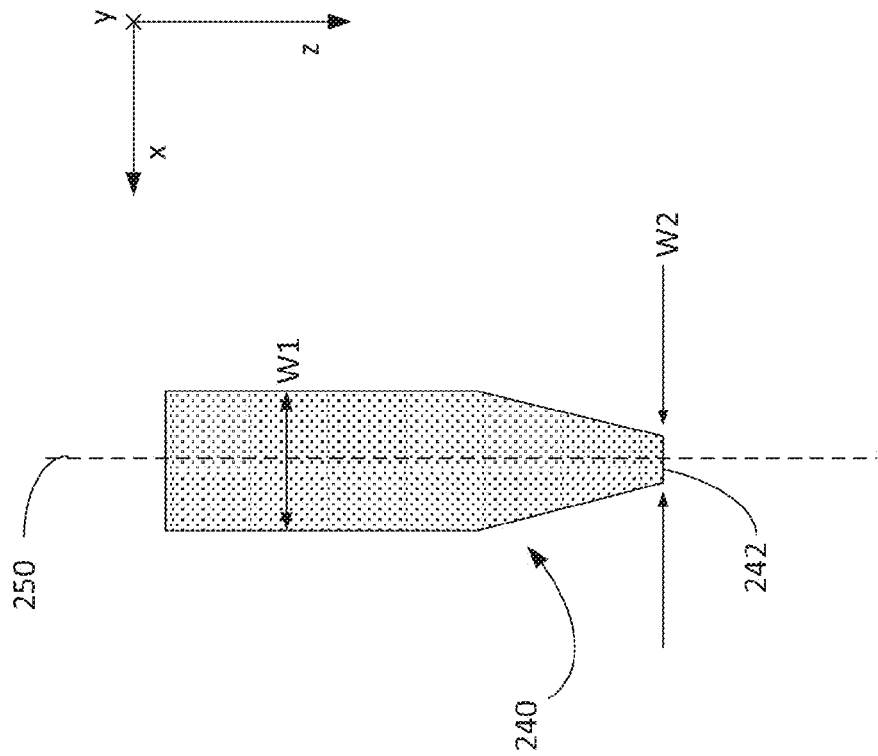
FIG. 5A is a top elevation view of a symmetric tapered region according to some embodiments.

In some embodiments, the tapered region 240 of the second waveguide 220 is symmetric, as illustrated in FIG. 5A. The tapered region 240 is symmetric about the same imaginary y-z plane 250 that bisects both the first waveguide 210 and the second waveguide 220. When the tapered region 240 is symmetric, the width of the second waveguide is reduced by forming the side walls of the second waveguide 240 to angle towards the plane of symmetry 250. The tapered region 240 may be linear, as illustrated in FIG. 5A, or nonlinear such that the sidewalls of the second waveguide 240 in the tapered region are not straight lines.

In some embodiments, the tapered region 240 of the second waveguide 220 is asymmetric, as illustrated in FIG. 5B. The tapered region 240 is asymmetric about the same imaginary y-z plane 250 that bisects both the first waveguide 210 and the second waveguide 220. When the tapered region 240 is asymmetric, the width of the second waveguide is reduced by angling only one of the two side walls of the second waveguide 240 towards the opposing side wall. The tapered region 240 may be linear, as illustrated in FIG. 5B, or nonlinear such that one of the two sidewalls of the second waveguide 240 in the tapered region is not a straight line.

In some embodiments, the waveguide device 200 may be used to facilitate coupling of light from the waveguide device 200 to an optical fiber 260 (see FIG. 2). In some embodiments, the transverse cross-section of the terminal face 242 of the tapered region 240 of the second waveguide 220 may be selected such that the output transverse mode size of the light from the terminal face 242 maximizes the amount of light that is coupled into an optical fiber 260 placed near or in contact with the terminal face. The reduction of size of the transverse cross-section of the second waveguide 220 in the tapered region 240 causes the transverse mode size to increase to a size that is more suitable for optical fibers, which are typically fabricated from a dielectric with a smaller index of refraction than silicon, thereby requiring a larger transverse mode size for efficient coupling of light. The increase in mode size is due to the transverse cross-section of the second waveguide 220 becoming too small to significantly confine the light, resulting a significant amount of the light to be guided outside of the waveguide material itself.

Figure 6:
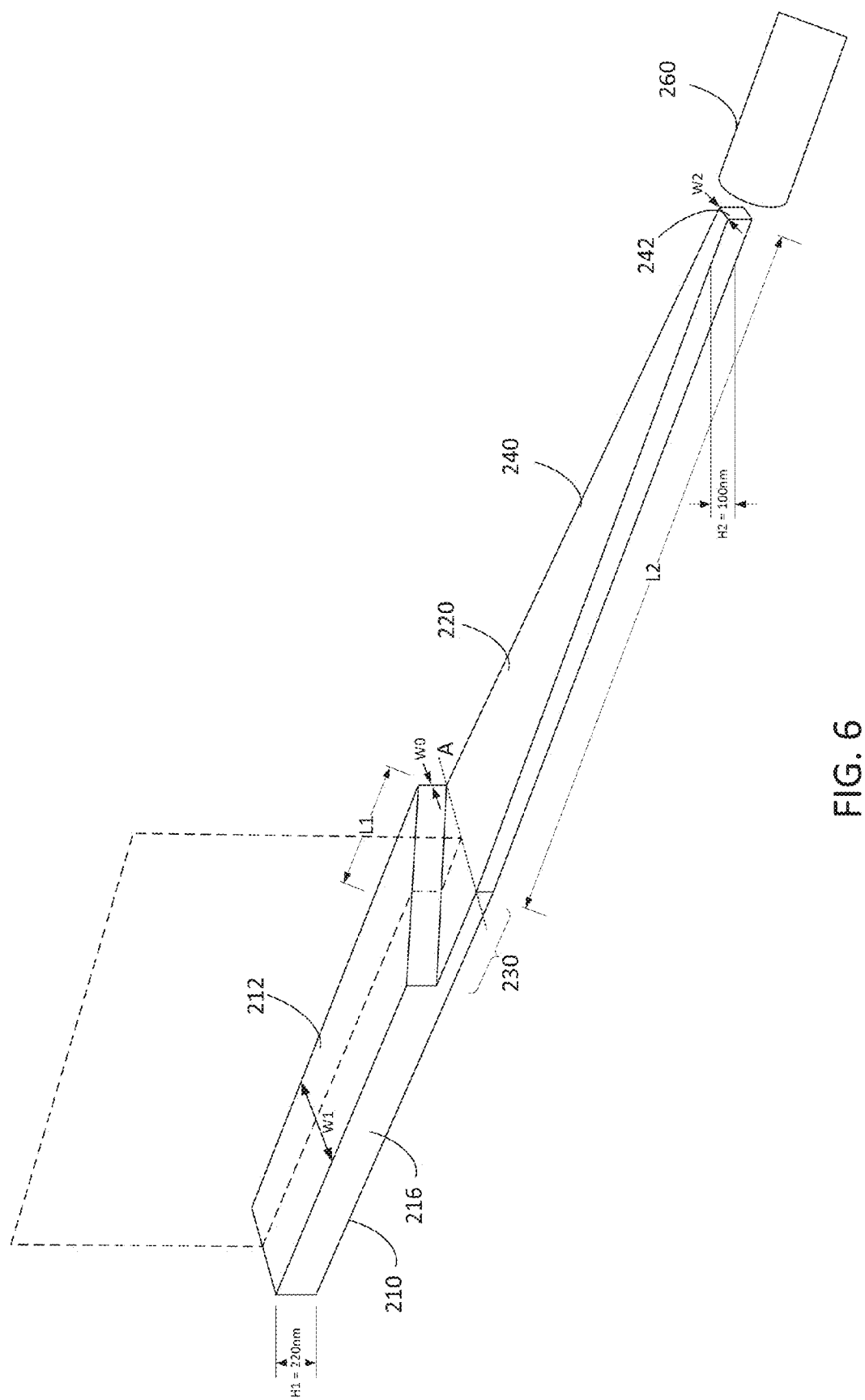
FIG. 6 is a perspective view of a waveguide device according to some embodiments.

In some embodiments, the first portion of the second waveguide is omitted, as illustrated in FIG. 6. In such embodiments, the second waveguide 220 only includes the tapered region 240. Thus, the tapered region 240 may be adjacent to the transition region 230 in some embodiments.

Figure 7:
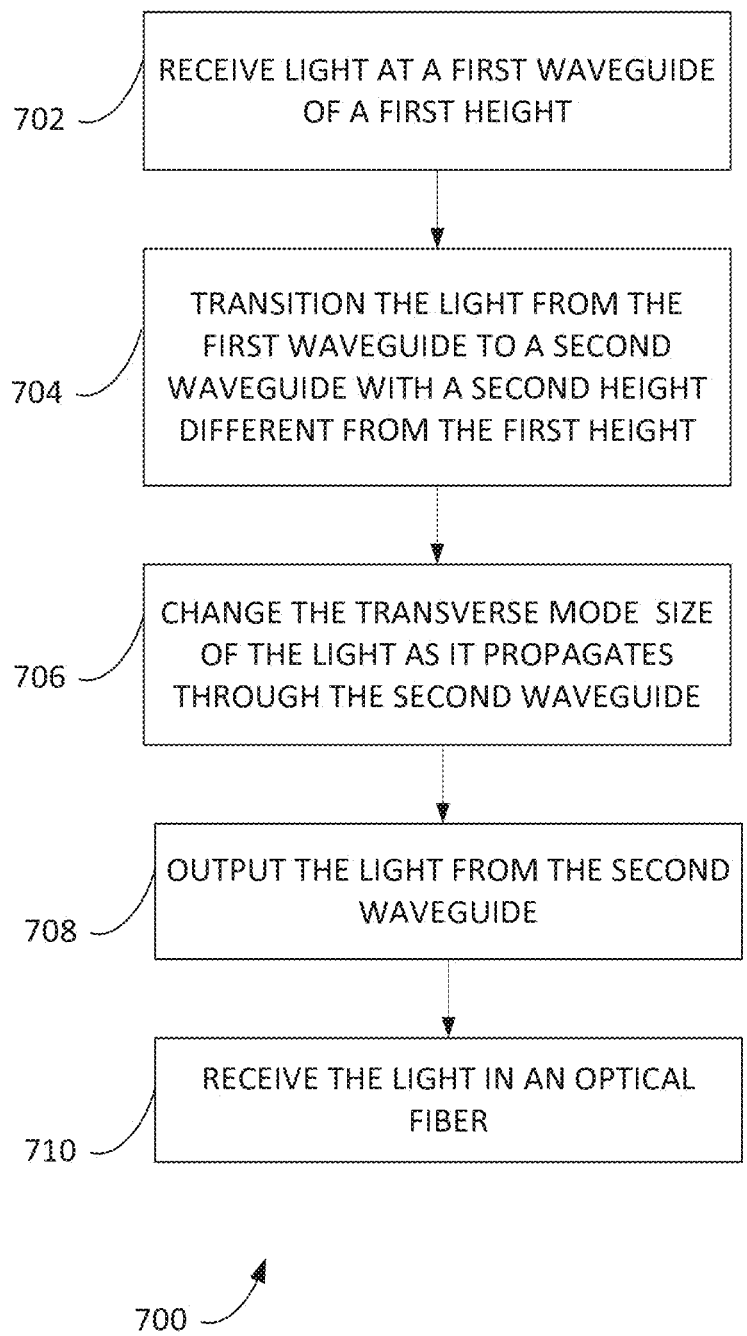
FIG. 7 is a flowchart of a method according to some embodiments.

FIG. 7 is a flowchart of a method 700 according to some embodiments. At act 702, light is received at a first waveguide of a first height on a photonic chip. The light may be received in any way suitable to couple light to the first waveguide. In some embodiments, the light may be received from one or more other components on the photonic chip. In other embodiments, the light may be coupled to the first waveguide from a free space using one or more lenses. Any wavelength of light may be used, including ultraviolet, visible and infrared light.

At act 704, the light is transitioned from the first waveguide to a second waveguide with a second height different from the first height of the first waveguide. This may be accomplished using an asymmetric taper of the first waveguide, as discussed above.

At act 706, the transverse mode size of the light propagating through the second waveguide is changed. In some embodiments, the transverse mode size of the light is changed by changing the transverse cross-section of the second waveguide as a function of the location in the direction of light propagation (e.g., the z-direction in FIG. 2). For example, the width of the second waveguide could become larger or smaller as a function of the distance from the end of the waveguide. In some embodiments, reducing the width of the second waveguide as a function of position along the waveguide results in the transverse mode size of the light increasing.

At act 708, the light is output from the second waveguide, and at act 710 the light is coupled into an optical fiber. In some embodiments, the light is output from the waveguide by allowing the light to couple to free-space. In other embodiments, an optical fiber is butt-coupled to the second waveguide such that the optical fiber is in physical contact with the waveguide. In embodiments that output the light to free space, the light may be collimated and guided using at least one lens. Additionally, one or more lenses may be used to image the light from the waveguide onto the core of the optical fiber to increase the coupling efficiency to the optical fiber.

A waveguide device 200 according to some embodiments may be fabricated in any suitable way. One possible embodiment of a method 1000 of manufacturing a waveguide device is now described in connection with FIGS. 8, 9A-9B and 10.

Figure 8:
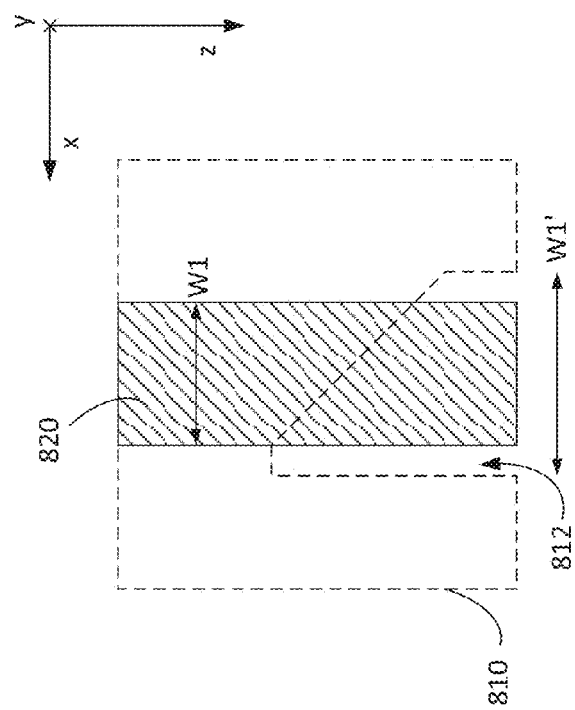
FIG. 8 illustrates two masks that may be used in a method of fabrication of a waveguide device according to some embodiments.

FIG. 8 illustrates two masks that may be used in a method 1000 (see FIG. 10) to form the portion of the waveguide device 200 illustrated in FIG. 4. A first mask 810 is shaped such that a gap 812 in the first mask 810 leaves a portion of an underlying material exposed, the gap has a width W1' that is greater than the width W1 of the desired first waveguide 210. The gap 812 of the first mask 810, as well as the resulting exposed portion of the underlying material, is asymmetric with respect to an imaginary plane that bisects the width of the first waveguide 210 (the same plane bisects the width W1' of the gap 812). A second mask 820 has a width W1 equal to the width of the first waveguide 210. The second mask is an elongated rectangular shape that matches the shape of the first waveguide 210 and the second waveguide 220, as shown in FIG. 4. In some embodiments, at least the second mask is a hard mask, which may allow a sharp edge to be obtained where the first waveguide steps down in height to the second waveguide.

Figure 9A:
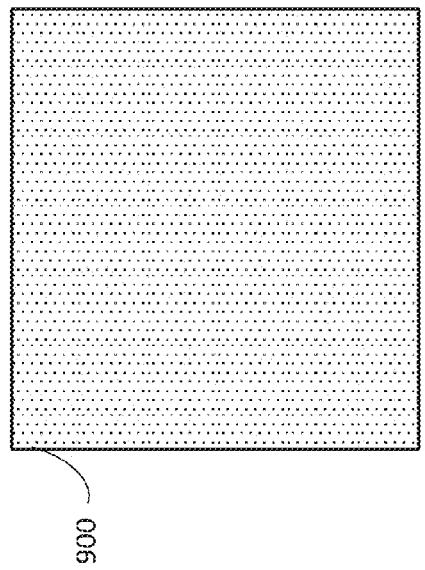
FIG. 9A is a top elevation view of the guiding material layer prior to applying any masks.
Figure 10:
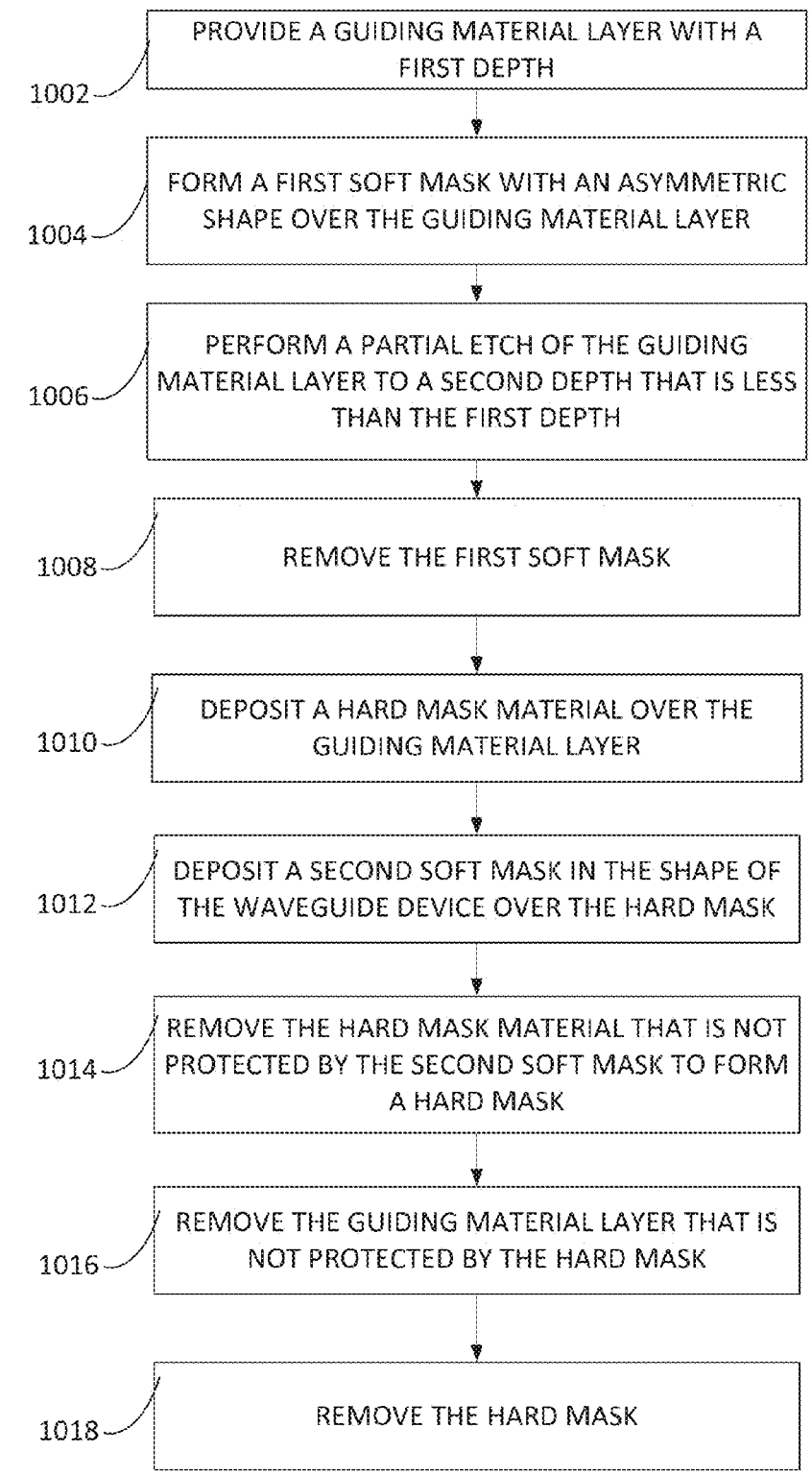
FIG. 10 is a flowchart of a method of fabricating a portion of a waveguide device according to some embodiments.

The method 1000 of forming the portion of the waveguide device 200 is shown in FIG. 10. At act 1002, a guiding material layer 900 of a first depth is provided. The guiding material layer 900 is illustrated in FIG. 9A. The layer 900 is formed from a material that will ultimately become the guiding material of the first waveguide 210 and the second waveguide 220. Accordingly, the guiding material layer 900 may be formed from any material suitable for forming a waveguide. For example, the guiding material layer 900 may be a silicon layer. The first depth of the guiding material layer 900 may be any depth based on the height of the waveguide device 200 being fabricated. For example, if the first waveguide 210 is to have an ultimate height of 220 nm, then the first depth of the guiding material layer may be 220 nm.

At act 1004, a first mask 810, as illustrated in FIG. 8, is formed over the guiding material layer 900. In some embodiments, the first mask 810 may be a soft mask. For example, the first mask 810 may be photoresist. In other embodiments, a hard mask may be used. For example, silicon nitride may be used to form the first mask 810.

At act 1006, a partial etch of the guiding material layer 900 is performed. The partial etch removes a portion of the guiding material layer 900 that is exposed by the gap 812 in the first mask 810. Any etching technique may be used. In some embodiments, reactive ion etching is used to perform the partial etch of act 1006. In some embodiments, the partial etch does not remove all of the exposed guiding material layer. Instead, only guiding material down to a second depth is removed. The second depth is less than the first depth of the guiding material layer 900. Thus, the guiding material layer 900 is made thinner in the regions exposed by the gap 812 in the first mask 810. In some embodiments, the second depth is less than half the first depth, resulting in a thinned guiding material layer 910 (see FIG. 9B) that is more than half the first depth. In other embodiments, the second depth is 30-70% of the first depth, resulting in a thinned guiding material layer 910 that is between 70% and 30% of the first depth. For example, the first depth of the guiding material layer may be 220 nm and the partial etch may etch to a second depth of 70 nm. Thus, 70 nm of the 220 nm thick guiding material layer 900 may be removed, leaving a 150 nm thinned guiding material layer 910.

Figure 9B:
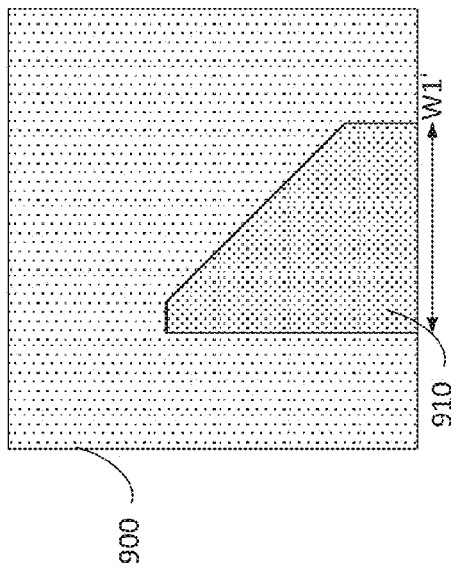
FIG. 9B is a top elevation view of a partially formed waveguide device after a first partial etch has been performed.

At act 1008, the first soft mask is removed. FIG. 9B illustrates the resulting structure. The guiding material layer 900 continues to have a first depth, except where the thinned guiding material layer 910 is formed due to the partial etch.

At act 1010, a hard mask material is deposited over the guiding material layer 900 and the thinned guiding material layer 910. Any hard mask material may be used. In some embodiments, silicon nitride is used as the hard mask material.

At act 1012, a second soft mask, with the shape of mask 820 of FIG. 8, is deposited over the hard mask material. The second soft mask may be formed from, for example, photoresist.

At act 1014, the hard mask material that is not protected by the second soft mask is removed, leaving a rectangular hard mask 820 the shape of the waveguide device 200, as illustrated in FIG. 8.

At act 1016, the guiding material layer that is not protected by the hard mask is removed. This may be achieved using any suitable etching technique. In some embodiments, reactive ion etching is used to remove the guiding material layer. In some embodiments, the exposed guiding material layer is complete removed such that the only guiding material that remains is the guiding material protected by the hard mask.

At act 1018, the hard mask is removed. The resulting structure is the portion of the waveguide device illustrated in FIG. 4, which includes an asymmetric taper and a discrete step down in height from the first waveguide 210 to the second waveguide 220.

Some of the above embodiments have described transitioning light from a first waveguide to a second waveguide where the first waveguide has a height that is larger than the height of the second waveguide. Embodiments are not so limited. In some embodiments, a waveguide device may be used to transition light from a first waveguide to a second waveguide where the first waveguide has a height that is less than the height of the second waveguide.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

What is claimed is:

1. A waveguide device comprising:
    a first waveguide with a first height;
    a second waveguide with a second height different from the first height; and
    a transition region between the first waveguide and the second waveguide, the transition region comprising a first asymmetrical taper of the first waveguide, the first asymmetrical taper being formed from a single edge extending between opposed first and second sides of the first waveguide;
    wherein the second waveguide has a second asymmetrical taper, the second asymmetrical taper having an edge that is co-linear with and parallel to the first side of the first waveguide.

2. The waveguide device of claim 1, wherein the first height and the second height is along a first direction, and the first asymmetrical taper is asymmetric about an imaginary plane that bisects a width of the first waveguide, wherein the width of the first waveguide is along a second direction perpendicular to the first direction.

3. The waveguide device of claim 1, wherein the first waveguide is configured to support a first optical mode and the second waveguide is configured to support a second optical mode, the first and second optical modes being polarized along a common polarization direction.

4. The waveguide device of claim 1, wherein the transition region comprises a transition tip with a width less than 50 nm.

5. The waveguide device of claim 1, wherein the second waveguide has a first width at the transition region and a second width a first distance from the transition region, wherein the first width is greater than the second width.

6. The waveguide device of claim 1, wherein the second asymmetrical taper begins at the transition region.

7. The waveguide device of claim 1, wherein the first waveguide has a transverse width that supports only a first mode in a TE polarization and a second mode in a TM polarization at an operational wavelength.

8. The waveguide device of claim 1, wherein the first waveguide is formed from silicon.

9. The waveguide device of claim 1, wherein the waveguide device is monolithic.

10. A method comprising:
    receiving light within a first waveguide of a photonic chip, wherein the first waveguide has a first height;
    transitioning the light from the first waveguide to a second waveguide of the photonic chip using a first asymmetrical taper of the first waveguide, wherein the second waveguide has a second height different from the first height, wherein the first asymmetrical taper is formed from a single edge extending between opposed first and second sides of the first waveguide, and wherein the second waveguide has a second asymmetrical taper, the second asymmetrical taper having an edge that is co-linear with and parallel to the first side of the first waveguide.

11. The method of claim 10, wherein the first height and the second height is along a first direction, and the first asymmetrical taper is asymmetric about an imaginary plane that bisects a width of the first waveguide, wherein the width of the first waveguide is along a second direction perpendicular to the first direction.

12. The method of claim 10, wherein the light is polarized along a polarization direction within the first waveguide and is polarized along the polarization direction within the second waveguide.

13. The method of claim 10, further comprising:
changing a transverse mode size of the light as it propagates through the second waveguide.

14. The method of claim 10, further comprising:
outputting the light from the second waveguide; and
receiving the light at an optical fiber.

* * * * *